United States Patent [19]

Arav

[11] Patent Number: 4,821,384
[45] Date of Patent: Apr. 18, 1989

[54] SELF-LOADING CONTROLLED DEFLECTION ROLL

[75] Inventor: Ronnie A. Arav, Netania, Israel

[73] Assignee: Beloit Corporation, Beloit, Wis.

[21] Appl. No.: 117,052

[22] Filed: Nov. 5, 1987

[51] Int. Cl.[4] ............................................. B21B 31/32
[52] U.S. Cl. ................................. 29/113.2; 29/116.2; 100/162 B
[58] Field of Search ......... 29/113 R, 113 AD, 116 R, 29/116 AD, 117; 100/162 B

[56] References Cited

U.S. PATENT DOCUMENTS

| | | | |
|---|---|---|---|
| 2,395,915 | 3/1946 | Specht | 29/116 X |
| 3,430,319 | 3/1969 | Skaugen | 29/116 AD |
| 3,587,152 | 6/1971 | Hold | 29/116 |
| 3,802,044 | 4/1974 | Spillmann et al. | 29/113 |
| 3,879,827 | 4/1975 | Lehmann | 29/116 |
| 3,885,283 | 5/1975 | Biondetti | 29/116 |
| 3,919,753 | 11/1975 | Lehmann | 29/113 |
| 4,188,698 | 2/1980 | Appenzeller | 29/116 AD |
| 4,213,232 | 7/1980 | Biondetti et al. | 29/116 |
| 4,249,290 | 2/1981 | Lehmann | 29/116 |
| 4,282,638 | 8/1981 | Christ et al. | 29/116 |
| 4,282,639 | 8/1981 | Christ et al. | 29/116 |
| 4,299,162 | 11/1981 | Hartmann et al. | 100/43 |
| 4,301,721 | 11/1981 | Liessen et al. | 100/170 |
| 4,328,744 | 5/1982 | Pav et al. | 100/162 |
| 4,334,344 | 6/1982 | Biondetti | 29/116 |
| 4,389,933 | 6/1983 | Pav | 100/162 |
| 4,404,724 | 9/1983 | Christ et al. | 29/116 |
| 4,453,299 | 6/1984 | Hemmi | 29/116 AD |
| 4,520,723 | 6/1985 | Pav et al. | 100/162 |

FOREIGN PATENT DOCUMENTS 61-24813 1/1986 Japan .
61-24814 2/1986 Japan .
61-27306 2/1986 Japan .

OTHER PUBLICATIONS

Undated Article, Entitled "The Compact Loading System Kusters".
Advertisement entitled "The New Hydrein Roll System Perfects Nip Control-Improves CD Profile", Pulp & Paper, Sep. 1985, p. 264.

Primary Examiner—Mark Rosenbaum
Assistant Examiner—Frances Chin
Attorney, Agent, or Firm—Dirk J. Veneman; Raymond W. Campbell; Mathews: Gerald A.

[57] ABSTRACT

A controlled deflection press roll structure for coacting with an opposed member to form a press nip including a rotatable roll shell and a stationary support shaft extending therethrough with a plurality of first hydraulically supported shoes extending axially along the shell supported on the shaft, a second shoe opposite the nip for applying a nip unloading force, third shoes lateral of the nip located at the end of the nip for stabilizing the shell and axially facing pads for the end shoes supporting the shoes on the shaft.

9 Claims, 3 Drawing Sheets

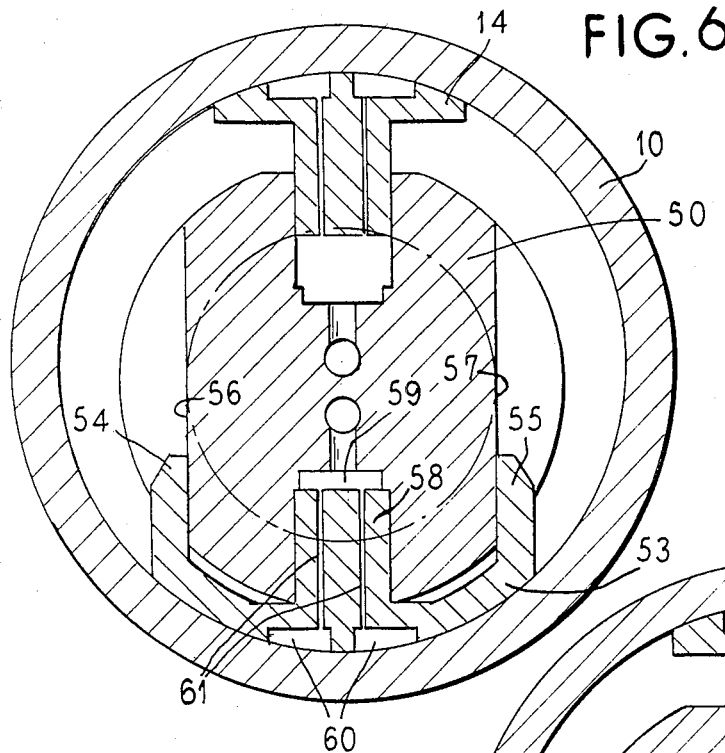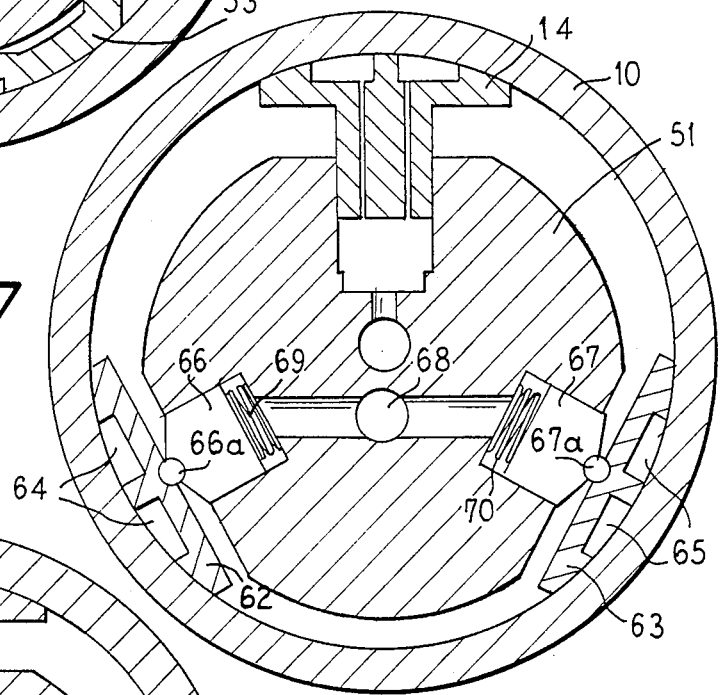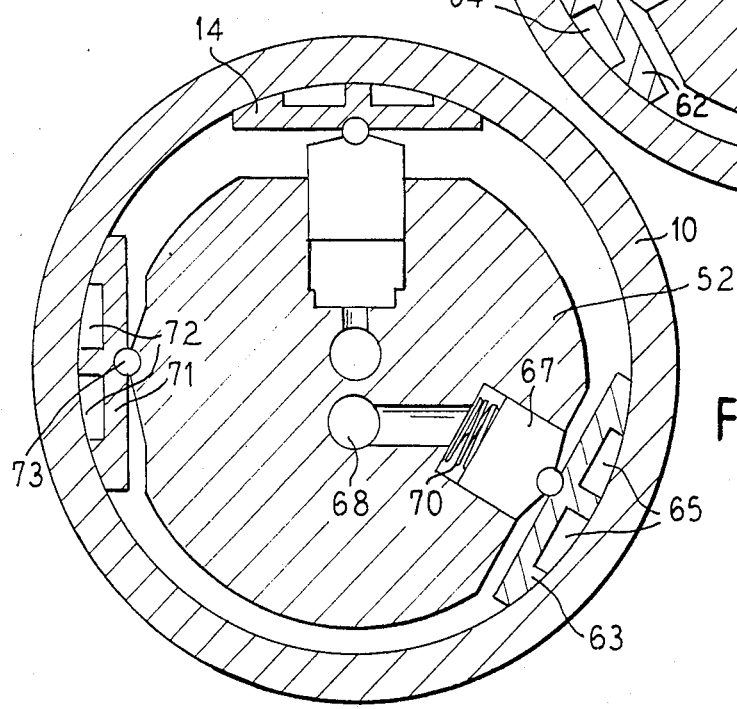

SELF-LOADING CONTROLLED DEFLECTION ROLL

BACKGROUND OF THE INVENTION

The present invention relates to improvements in controlled deflection rolls such as are used in the papermaking industry and more particularly to improved arrangements wherein roll shells are loaded toward the nip and are stabilized on a supporting through shaft.

More particularly, this invention relates to controlled deflection press rolls which have been called self-loading rolls. In this type of controlled deflection roll, a rotatable roll shell is carried on a stationary through shaft and force means loads the roll shell in the direction of the nip supporting it on the shaft. This force means not only controls the nip pressure but controls the uniformity or nonuniformity desired along the length of the nip by controlling the forces at different axial locations along the length of the roll shell.

Such self-loading controlled deflection rolls have conventionally used sliding hydraulically supported shoes supported on the shaft and applying an inner force to the roll shell or have transmitted a force from the shaft to the roll shell by a hydraulic pool of oil which is contained by seals.

One of the controlled operational functions of the roll involves requirements at start-up and shut-down wherein the nip must be loaded or unloaded Various ways have been devised to accomplish this and a conventional way is to merely unload the loading means which forces the roll shell toward the nip and other means employed have used positive loading and unloading means by shoes or pistons applying a force to the inside of the roll shell in a direction opposite of the nip. A requirement of a self-loading roll is that it be capable of uniform stable operation at the high speeds encountered in present paper machines. Because of the high forces involved and the large weights, vibrations can occur which if not avoided, will cause chattering and barring on the paper web and result in defects of the finished paper. Another problem encountered is axial roll oscillation which if allowed to occur, can cause damage and nonuniformity in the pressed paper web and also cause damage to the felts so that if this factor is controlled, felt life will improve. Defects in operation such as vibration and oscillation will also cause damage to the outer surface of the roll shell requiring more frequent grinding and resurfacing than otherwise would be necessary.

It is accordingly an object of the present invention to provide an improved self-loading roll construction which avoids disadvantages heretofore present in the prior art and which provides improved loading and unloading functions for the roll. A further object of the invention is to provide an improved self-loading roll structure which avoids or eliminates vibration by damping and one which eliminates the need for ball bearings wherein the shell rotates only on an oil film.

A further object of the invention is to provide an improved self-loading roll structure which eliminates axial roll oscillation and thereby improving felt life and lengthening the time between grinding in applications such as in paper machine calenders.

A still further object of the invention is to provide an improved self-loading roll structure where manufacturing accuracy can be increased in that supporting bearing pads and main pistons for applying load operate on the same shell bore. A further overall object of the invention is to provide an improved self-loading roll structure which eliminates the need for more expensive bearings and other parts, excludes the need for external arms and pistons and eliminates the need for oil feed to bearings in the main pistons and reduces the overall cost of construction and assembly.

SUMMARY OF THE INVENTION

In accordance with the principles of the invention, the rotatable roll shell is supported on the supporting through shaft on a plurality of shoes which extend axially along between the roll shell and shaft and are supported on pistons with the pistons arranged to be controllably pressured so that controlled pressure along the nip can be achieved. The shoes in one form have pockets which are pressured for lubrication by bleed holes extending up through the pistons and supplied with the same oil that furnishes the hydraulic pressure for loading the shoes against the inner surface of the shell. An opposing shoe in one form extends downwardly and is capable of rapidly unloading the nip acting in the opposite direction from the supporting shoes. Additionally, stabilizing shoes for centering the roll shell on the shaft are located either at the 90° position or the 120° position relative to the primary force applying shoes. Pressure oil and lubricating oil for operating the various shoes and pistons is obtained from a common source with a common pressure supply pump feeding through pressure controls to each of the locations required for pressurizing and lubricating the shoes and pistons. Shoes are positioned laterally of and in opposition to the roll supporting shoes and are located at the end of the shell and stabilize and center the shell eliminating the need for expensive bearings.

Other advantages, objectives and features will become more apparent with the teaching of the principles of the invention in connection with the disclosure of the preferred embodiments thereof in the specification, claims and drawings, in which:

DESCRIPTION OF THE DRAWINGS

FIG. 6 is a somewhat schematic end view showing the location of various shoes in one form of construction with the somewhat schematic sectional view taken substantially at the location of section line IV—IV of FIG. 3; and FIGS. 7 and 8 are views similar to FIG. 6 but showing two additional arrangements for shoe locations.

DESCRIPTION OF THE PREFERRED EMBODIMENTS

Figure 1:
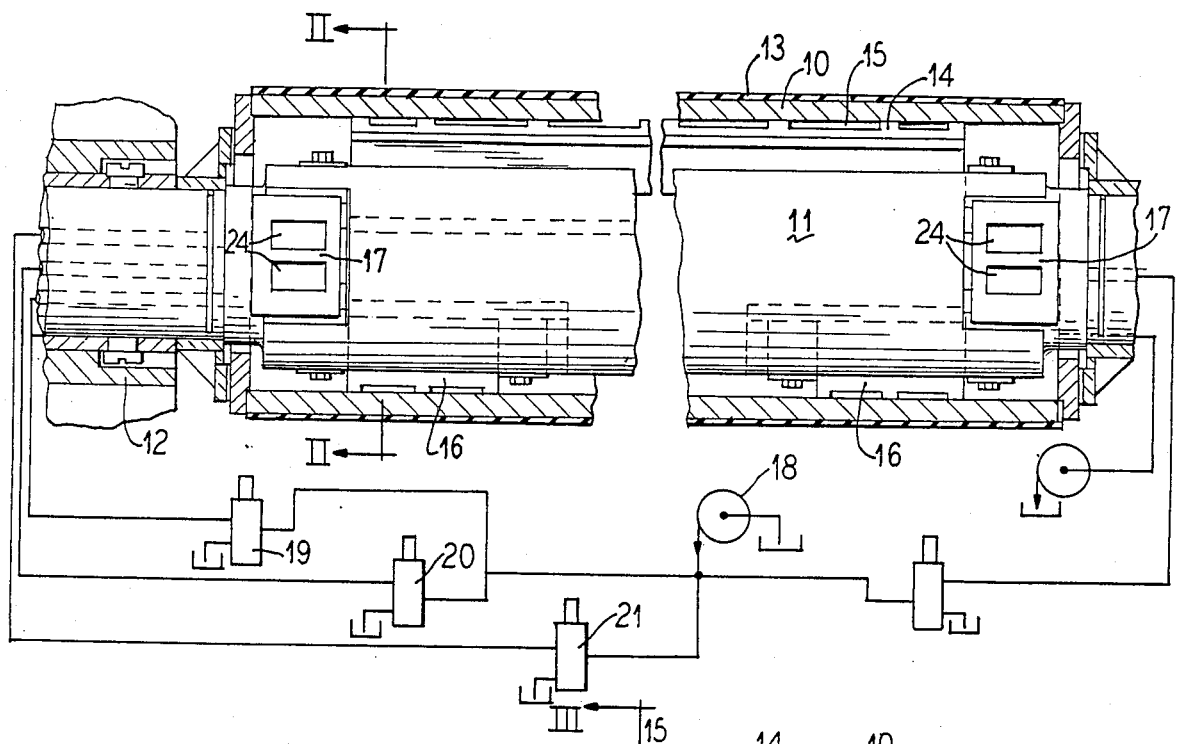
FIG. 1 is a vertical sectional view taken through a self-loading controlled deflection roll constructed and operating in accordance with the principles of the present invention.

As illustrated in FIG. 1, a rotatable roll shell 10 is supported on a stationary through shaft 11. The roll shell coacts with an opposing member, not show, to form a pressure nip substantially at 13 and the nip is loaded by a unitary or a plurality of axially extending shoes 14 which have oil lubricating pressure pockets 15 therein facing the inner smooth surface of the roll shell. The shoes 14 are supported on corresponding pistons 14a. The roll shell may be smooth polished on the outer surface or may be covered with a rubber or other compound.

At a lower location, that is 180° opposite the loading shoes 14, are unloading shoes 16 which are located at the ends of the roll shell. These shoes are supported on the stationary shaft by piston 16a and are normally operated with light contact pressure against the inner surface of the roll shell until such time as the nip is to be unloaded at which time the shoes 16 are forced downwardly to move the roll shell downwardly to unload and open the nip. The shoes 16 are located at the ends of the roll shell and are complementary to the loading shoes 14 and to the roll shell in that they additionally help stabilize the roll shell at operational speeds to avoid chattering and vibration. Also aiding in the avoidance of chattering and vibration are lateral end shoes 17 as shown in FIGS. 1, 2, 4 and 5.

Figure 2:
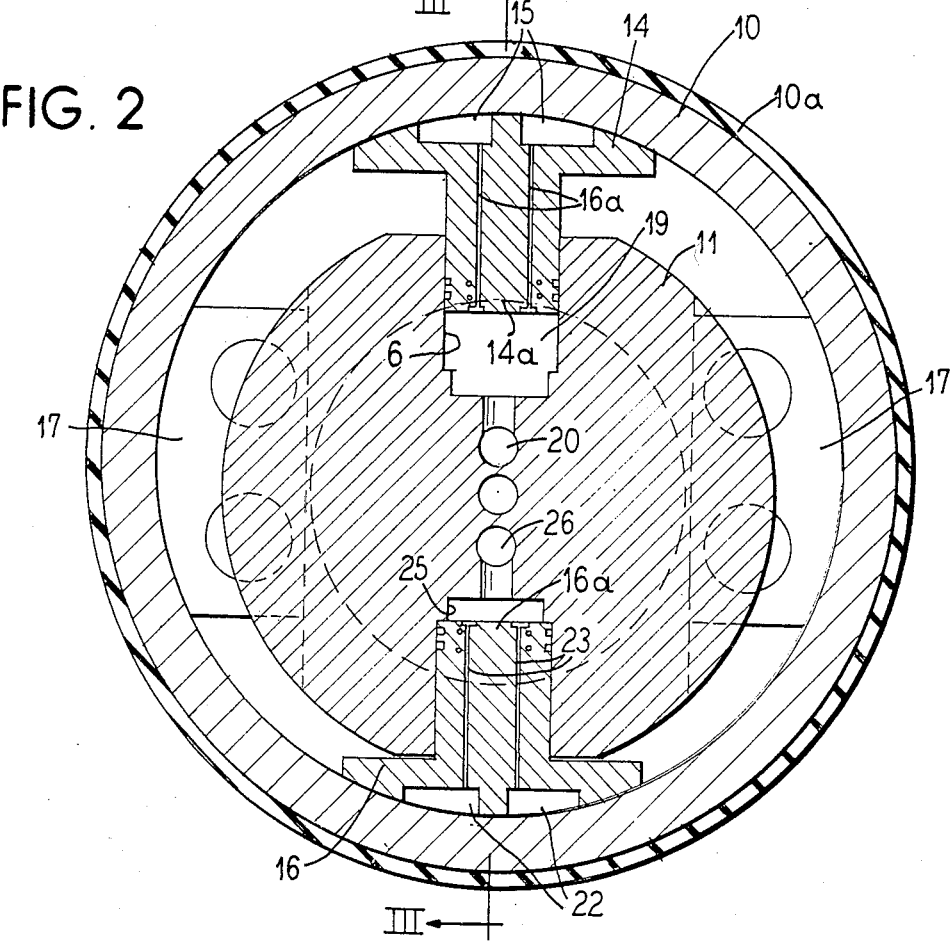
FIG. 2 is a vertical sectional view taken substantially along line II—II of FIG. 1.
Figure 3:
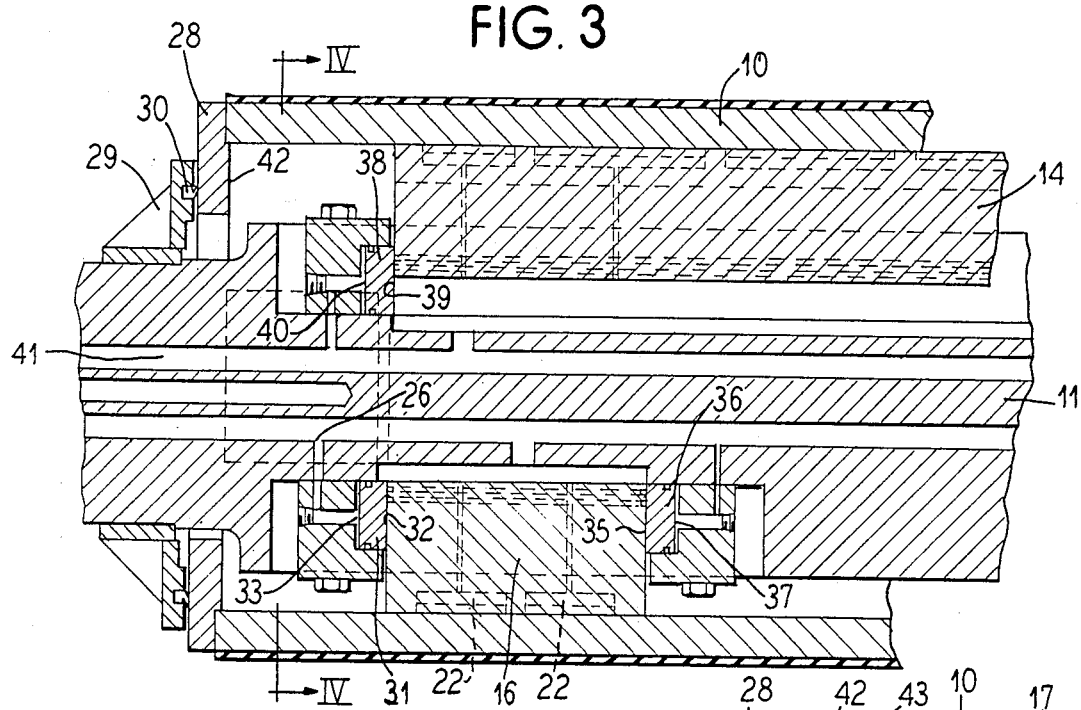
FIG. 3 is a sectional view taken along the axis of the roll substantially along line III—III of FIG. 2

FIG. 2 additionally shows the unloading shoes 16 which have oil pockets 22 therein. Lubricating oil is fed to the pockets through throttling bores 23 extending up through the center of supporting pistons 16a which are slidably mounted in cylinders 25. Oil for pressurizing the surfaces beneath the pistons 24 is supplied through an axial bore 26 extending through the ends of the shaft.

Similarly, an oil pressure supply bore 20 extends through the shaft to supply a chamber 6 beneath a piston 14a supporting the shoes 14. The shoes 14 have oil pockets which are supplied through throttling bores 16a extending up through the pistons 18 and supplied oil from the chamber 6 beneath the piston. Obviously, the oil pressure beneath the loading pistons 14, supplied through the bore 20 is substantially larger than the pressure supplied through the bore 26, and as will be described in connection with a feature of the invention, the oil for these bores 20 and 26 as well as for the lubrication of the pockets in the shoes is supplied from a common pump shown at 18 in FIG. 1. This common pump also supplies the oil pressure and lubricating oil for the lateral shoes 17.

The lateral shoes 17 are located essentially 90° from the pressure shoes 14 and are located at each end of the roll shell. The lateral shoes stablize and center the roll shell relative to the shaft 11 and do so eliminating the need for expensive bearings of the type which have heretofore been needed.

The shaft 11 is held stably at its ends by suitable framework 12.

Figure 5:
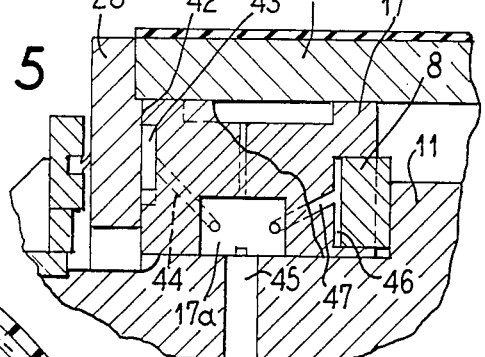
FIG. 5 is a fragmentary enlarged sectional view of one form of arrangement for the end of the roll shell.
Figure 4:
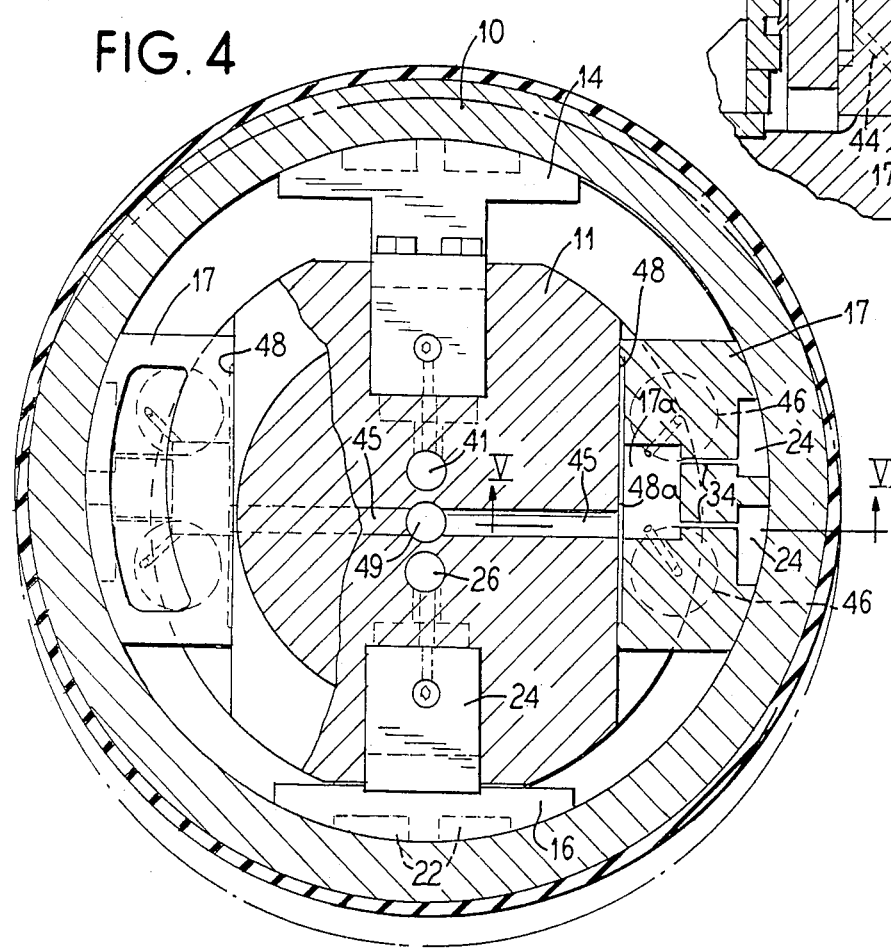
FIG. 4 is a vertical sectional view taken substantially along line IV—IV of FIG. 3 showing the construction of the stabilizing shoes at the ends of the roll shell.

With reference to FIGS. 4 and 5, the lateral shoes 17 are supplied with oil from a bore 49 through the shaft which feeds out through lateral passages 45 to the individual lateral shoes. The lateral shoes have pockets 24 in their outer faces for lubricating the shoes relative to the smooth inner surface of the roll shell 10. The pockets are supplied through throttling bores 34 leading from a chamber 17a in the base of the shoe with the chamber being supplied by the lateral passage 45.

The shoes are uniquely vertically movable by being slidable on guide surface means 48 at the sides of the shaft. A communication means comprising of an elongate relieved portion 48a in the base of the shoe insures constant communication with the lateral passage 45 as the shoes slide up or down with shifting of the roll shell relative to the shaft 11. Thus, the opposed lateral shoes 17 at each end of the shaft center and stabilize the roll shell laterally and are self-maintained in line with the axial center of the roll shell in that they can slide up and down as the roll shell moves up and down. The vertical position of the roll shell is, of course, controlled by the force shoe 14 and the nip relieving shoe 16.

The lateral shoes are uniquely held in place and in turn function to stabilize the axial position of the roll shell by pads which face axial relative to the shaft. As shown in FIG. 5, the roll shell has an annular ring 28 secured thereto. The axial outer face of this ring has an annular lip seal 30 carried in a ring 29 on the shaft and this lip seal 30 prevents the leakage of a small amount of oil which may occur in the space inwardly of the seal.

The inner face 42 of the ring 28 faces a circular oil pocket 43 thereby allowing the roll shell to rotate and the oil pocket 43 is supplied with pressurized oil through a passage 44 leading from the lateral passage 45. The lateral shoe 17 encounters an axial force in the opposite direction from a pad 8 stationarily secured to the shaft. The pad 8 is circular and seats in a circular pocket 46 on the lateral shoe. The circular pocket 46 is pressurized through an oil passage 47 which communicates with the chamber 17a fed by the passage 45.

Thus, the lateral pad 17 transmits a stabilizing axial force to the roll shell from the shaft. The lateral pad is supported axially to the left in FIG. 5 by the oil in the pocket 46 and the shoe 17 transmits this supporting force via the pocket 43 to the ring 42 on the roll shell 10. Thus, the lateral pads 17 provide not only a horizontal stabilizing force in the crossaxis direction as may be viewed in FIG. 4 but also a horizontal stabilizing force in the axial direction as viewed in FIG. 5. Each of the lateral pads is of the same construction and operates the same so that only the details of the pads shown in FIG. 5 have been described but it will be understood that the other lateral pads are of the same construction and operate in the same manner being fed through the axial passage 49.

Thus, all of the pressurized oil utilized by the structure is fed from the common pump 18 which through pressure control reducers 19, 20 and 21, FIG. 1, control the pressure supplied to the various bores including the bore 41 supplying the pressure shoes, the bore 49 supplying the lateral pads, and the bore 26 supplying the unloading shoes.

FIGS. 6 through 8 illustrate other forms of stabilizing and supporting the roll shell. In each of the figures, the roll shell is shown at 10 with the respective figures showing through shafts 50, 51 and 52 each of which have the self-loading shoes 14.

In the arrangement of FIG. 6, an unloading shoe 53 is provided which extends over a substantial arc of the inner surface of the roll shell 10 so that it provides lateral stabilizing forces to the end of the roll shell as well as unloading forces. This shoe 53 is located at each end of the roll shell and is provided with bracketing arms 54 and 55 which slidably engage outer surfaces 56 and 57 of the stationary shaft 50. This permits the shoe 53 to move up and down but holds the shoe in its lateral or horizontal position in a cross-axis direction as viewed in FIG. 6.

The radial outward force for the shoe 53 is obtained by oil pressure in a chamber 59 pressurizing the base of a piston 58. Throttling bores 61 lead from the chamber 59 to oil lubrication pockets 60 in the outer circumferential face of the shoe 53.

In the arrangement of FIG. 7, shoes 62 and 63 are provided substantially 120° from the location of the self-loading shoe 14. The shoes 62 and 63 are so located that they apply force components which function to stabilize the ends of the roll shell in a lateral direction as well as applying a nip unloading force when pressurized.

The shoes 62 and 63 have pockets 64 and 65 in their face which may be supplied with a separate source of oil, not shown, or supplied up through passages in pistons 66 and 67 which passages also are not shown. The shoes 62 and 63 are supported on pistons 66 and 67 on axially extending roll pins 66a and 67a. For loading the shoes, chambers are located beneath the pistons 66 and 67 supplied from a central oil pressure passage 68. This pressure can be dropped substantially to zero, and coil compression springs 69 and 70 are located beneath each of the pistons 66 and 67 to provide stabilizing forces to center the roll shell during normal operation.

In the arrangement of FIG. 8, a first shoe 63 is located substantially 120° from the pressure shoe 14 and this shoe can be used for unloading the nip. The shoe has pockets 65 similar to the shoes shown in FIG. 7 and has a supporting piston 67 with a stabilizing spring 70 beneath the piston. A chamber beneath the piston is supplied with oil from the supply line 68 to load the piston for unloading the nip.

A lateral stabilizing shoe 71 is provided spaced 150° from the shoe 63 and 90° from the pressure shoe 14. This lateral shoe 71 has pockets which are supplied with lubricating oil and is supported on a roll pin 73 directly supported on the stationary shaft 52.

Thus, in operation of the roll shell, referring to FIGS. 1 through 5, the nip is loaded at 13 by the shoes 14 applying an upward pressure to the inner surface of the roll shell 10 by the chamber 19 beneath the pistons 18 being pressurized.

Unloading of the nip will be accomplished by pressurizing the chamber 25 beneath the pistons 24 of the unloading shoe 16.

Throughout the operation the ends of the roll shell are stabilized and centered. The equipment which accomplishes this function also dampens the roll vibration and prevents chatter both in a radial direction as well as an axial direction of the roll shell. This is accomplished by the lateral shoes 17 which have lubricating pockets 24 and which are machined with a dimension to fill the spaces laterally of the center stationary shaft 11. The lateral shoes 17 are slidably mounted on vertical faces 48 on the shaft. Axial forces are applied to the ends of the roll shell by pressure in pockets 46 at the inner axial side of the lateral shoes 17. This force is transmitted axially to the roll shell by pockets 43 which are pressurized with oil and which face the smooth annular surface 42 of the annular ring 28.

Thus, it will be seen that I have provided a structure which meets the advantages and objectives above set forth and provides an improved controlled deflection roll such as used for presses and calenders in paper machinery. The roll eliminates the necessity for expensive bearings and the parts are lubricated, supported and damped on hydraulic chambers or pads of oil.

I claim as my invention:

1. A controlled deflection press roll structure for coacting with an opposed member to form a press nip comprising in combination:

a rotatable roll shell having a portion for receiving an axial force, a cylindrical inner surface and an outer surface for forming a press nip;

a stationary support shaft extending axially through the shell;

force means between the shaft and shell applying a controlled supporting force to the inner surface of the shell to obtain a predetermined pressure at the nip, said force means including pressure shoe means between the shell and shaft; and an axially facing hydraulic means between the support shaft and roll shell, said hydraulic means including a pair substantially radially opposed lateral shoes, each lateral shoe having a face surface for contacting the roll shell inner surface and an axially facing surface for exerting pressure against the portion for receiving the axial force on the roll shell, and an axially facing pad interposed between each lateral shoe and the support shaft, said lateral shoe and pads being hydraulically actuated to support and stabilize the roll shell against radial and axial movement relative to the support shaft.

2. A controlled deflection press roll structure for coacting with an opposed member to form a press nip constructed in accordance with claim 1:

wherein said axially facing hydraulic means is located at each end of the shell.

3. A controlled deflection press roll structure for coating with an opposed member to form a press nip constructed in accordance with claim 1:

wherein the roll shell portion for receiving an axial force comprises an annular ring secured thereto.

4. A controlled deflection press roll structure for coating with an opposed member to form a press nip constructed in accordance with claim 1:

wherein separated hydraulic means are operatively connected to the pressure shoe and to the lateral shoes whereby the nip force and lateral roll stabilizing force are independently controlled.

5. A controlled deflection press roll structure for coacting with an opposed member to form a press nip constructed in accordance with claim 4:

wherein the lateral shoes are disposed in pairs near each end of the roll shell; and further including guide surface means on either side of the support shaft corresponding to each pair of lateral shoes, each said guide means aligning its corresponding lateral shoes for transverse movement along the support shaft substantially parallel with the radial movement of the pressure shoe.

6. A controlled deflection press roll structure for coacting with an opposed member to form a press nip constructed in accordance with claim 5:

further including communication means in each lateral shoe for maintaining hydraulic communication between the hydraulic means and the lateral shoe as the lateral shoe moves transversely along the support shaft.

7. A controlled deflection press roll structure for coacting with an opposed member to form a press nip constructed in accordance with claim 6:

wherein the communication means comprises a relieved portion in each lateral shoe.

8. A controlled deflection press roll structure for coacting with an opposed member to form a press nip comprising in combination:

a rotatable roll shell having a cylindrical inner surface and an outer surface for forming a press nip;

a stationary support shaft extending axially through the shell;

a first shoe means between the shaft and shell applying a controlled supporting force to the inner surface of the shell to obtain a predetermined pressure at the nip;

a second shoe means between the shaft and shell spaced substantially 120° from the first shoe means applying a controlled supporting force to the inner surface of the shell to obtain a predetermined roll shell stabilizing pressure;

a third shoe means between the shaft and shell located substantially 90° from the first shoe means and 150° from said second shoe means; and means interposed between the roll shell and support shaft for axially stabilizing the roll shell.

9. A controlled deflection press roll structure for coacting with an opposed member to form a press nip comprising in combination:

a rotatable roll shell having a cylindrical inner surface and an outer surface for forming a press nip;

a stationary support shaft extending axially through the shell;

force means between the shaft and shell applying a controlled supporting force to the inner surface of the shell to obtain a predetermined pressure at the nip, said force means including shoe means between the shell and shaft;

laterally facing hydraulic pressure means applying a radially directed force in a direction normal to the location of the nip in opposed directions thereto for stabilizing the ends of the shell relative to the shaft; and guide surface means on either side of the support shaft for aligning the laterally facing pressure means for transverse movement along the support shaft substantially parallel with the radial movement of the shoe means.

* * * * *